Patented Apr. 15, 1930

1,754,390

UNITED STATES PATENT OFFICE

BRUNO HEYN, OF OFFENBACH-ON-THE-MAIN, GERMANY, ASSIGNOR TO GENERAL ANILINE WORKS, INC., OF NEW YORK, N. Y., A CORPORATION OF DELAWARE

NEW DERIVATIVES OF 2.3-HYDROXY-NAPHTHOIC ACID AND PROCESS OF MAKING SAME

No Drawing. Application filed February 28, 1929, Serial No. 343,554, and in Germany February 27, 1928.

My invention relates to new derivatives of 2.3-hydroxynaphthoic acid corresponding probably to the general formula:

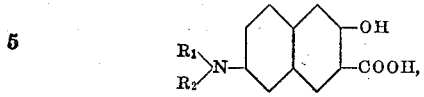

wherein $R_1$ and $R_2$ mean hydrogen or alkyl- or aralkyl- or arylradicles, and to a process of making same. The new compounds are obtainable by heating the 2.6-dihydroxy-naphthalene-3-carboxylic acid with a compound of the general formula:

wherein $R_1$ and $R_2$ have the aforesaid signification. As nitrogenous compounds of this kind may be mentioned ammonia or amines containing at least one reactive hydrogen atom at the nitrogen, for instance aniline, its homologous and substitutions products.

When diazotizing the aminonaphtholcarboxylic acid obtainable by reacting with ammonia upon 2.6-dihydroxynaphthalene-3-carboxylic acid and transforming the diazocompound according to Sandmeyer's reaction into the corresponding bromo-compound a bromohydroxynaphthoic acid is obtained, which is identical with the 6-bromo-2.3-hydroxynaphthoic acid described in German Patent 396,519. This fact may be considered as a proof of the correctness of the structure which I attribute to my new derivatives of 2.3-hydroxynaphthoic acid. The new compounds are valuable intermediates for the production of dyestuffs.

In order to illustrate my invention more fully the following examples are given:

*Example 1.*—300 parts of 2.6-dihydroxy-naphthalene-3-carboxylic acid are heated with 1800 parts of a concentrated solution of ammonia (density=0,9) in an autoclave for about 38 hours. Then the excess of ammonia is removed by distillation and the reaction product is precipitated by adding for instance hydrochloric acid to the remaining solution. The raw product thus obtained may be purified by redissolving it in a dilute hydrochloric acid, separating this solution of chlorohydrate from some impurities by filtration and precipitating the chlorohydrate from the solution by adding common salt. By decomposing the chlorohydrate with a dilute solution of sodium acetate the free 6-amino-2-naphthol-3-carboxylic acid of the formula:

is obtained. When recrystallized from the usual solvents it melts at 295°.

*Example 2.*—300 parts of 2.6-dihydroxy-naphthalene-3-carboxylic acid are heated with 1600 parts of an aqueous solution of methylamine of about 18 per cent strength under pressure at a temperature of about 170° to 175° C. for about 33 hours. Then the mass is poured when cool on a dilute hydrochloric acid (about 2200 parts of hydrochloric acid of 20° Bé. and 1000 parts of water) while stirring. The solution is separated from some impurities by filtration and the 6-methyl-amino-2-naphthol-3-carboxylic acid of the probable formula:

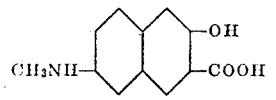

is precipitated by adding sodium acetate. The new compound may be purified by redissolving it in a dilute solution of sodium carbonate and acidifying the filtrated solution with acetic acid.

The chlorohydrate of the new acid is easily soluble in cold water and cannot be isolated therefrom by adding common salt. The barium salt is soluble in water.

*Example 3.*—204 parts of 2.6-dihydroxy-naphthalene-3-carboxylic acid are heated with 500 parts of aniline at about 170° C. for about 6 hours in an apparatus provided with a reflux condenser, then 60 parts of sodium carbonate are added to the mass and the excess of aniline is expelled by steam.

The raw product obtained by acidifying the liquir contains besides the formed 6-phenyl-amino-2-naphthol-3-carboxylic acid some unchanged 2.6-dihydroxynaphthalene-3-carboxylic acid and some anilide of the 6-phenylamino - 2 - naphthol - 3-carboxylic acid. By treating the raw product with a dilute solution of sodium carbonate both free acids are separated from the anilide insoluble in this solution. The two free acids are separated from each other for instance by converting them in their barium salts by adding barium chlorids to the neutral solution of the sodium salts obtained as described above. In this manner the barium salt of the 6-phenylamino-2-naphthol-3-carboxylic acid is precipitated. It is filtered off, washed and transformed into the sodium salt in the usual manner by boiling it with a sodium carbonate solution. From the filtrated solution thereof the free acid is precipitated by acidification for instance by means of hydrochloric acid. It corresponds probably to the formula:

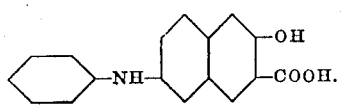

It represents when dry a bright yellow powder melting at 222–223° when recrystallized from glacial acetic acid.

The process may be likewise carried out by using the homologous or substitution products of aniline such as halogenated anilines, toluidines, xylidines, anisidines or their halogenated substitution products. By heating for instance 2.6-hydroxynaphthalene-3-carboxylic acid with p-chloroaniline a product is obtained which corresponds probably to the formula:

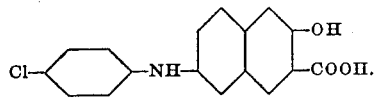

The reaction product from p-toluidine corresponds probably to the formula:

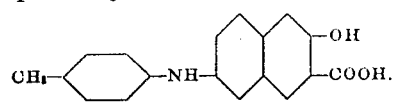

The reaction product from p-anisidine corresponds probably to the formula:

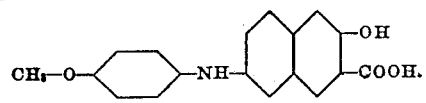

*Example 4.*—102 parts of 2.6-dihydroxynaphthalene-3-carboxylic acid are heated in an apparatus provided with a reflux condenser with 245 parts of benzylamine for about 6 hours in an oil bath a temperature of about 172° to 175° C. The mass is poured when cool into a diluted hydrochloric acid (800 parts of water and 220 parts of hydrochloric acid of 20° Bé.). The raw product separates at first as a compact viscous mass and then becomes solid when standing for a longer time. It is filtered off and dissolved in a hot solution of potassium carbonate. The free benzylaminonaphthol-carboxylic acid is isolated in a pure form by means of its barium salt as described above.

The 6-benzylamino-2-naphthol-3-carboxylic acid of the formula:

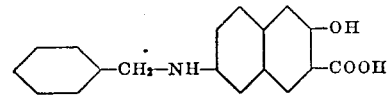

thus obtained is difficultly soluble in hot water, easily soluble in dilute hydrochloric acid, from which a precipitate separates in the cold being probably the chlorhydrate. The barium salt is difficultly soluble.

*Example 5.*—204 parts of 2.6-dihydroxynaphthalene-3-carboxylic acid are heated in an apparatus provided with a reflux condenser with 500 parts of monomethylaniline in an oil bath for about 15 hours. The condensation product is isolated as described above. In this case no arylide of the new acid is formed.

The 6-N-methylphenylamino-2-naphthol-3-carboxylic acid of the formula:

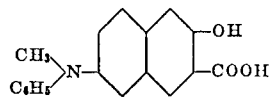

is when dry a yellow powder. It is difficultly soluble in hot water or hot dilute hydrochloric acid and forms a difficultly soluble barium salt.

I claim:

1. A process which comprises heating 2.6-dihydroxynaphthalene - 3 - carboxylic acid with a compound of the general formula:

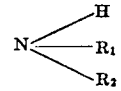

wherein $R_1$ and $R_2$ mean hydrogen or alkyl- or aralkyl- or aryl radicles.

2. A process which comprises heating 2.6-dihydroxynaphthalene - 3 - carboxylic acid with a compound of the general formula:

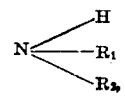

wherein $R_1$ means an arylresidue, $R_2$ hydrogen or an alkyl group.

3. A process which comprises heating 2.6-dihydroxynaphthalene - 3 - carboxylic acid with a compound of the general formula:

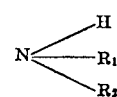

wherein $R_1$ means an arylresidue and $R_2$ hydrogen.

4. As new compounds 2.3-hydroxynaphthoic acid derivatives corresponding probably to the general formula:

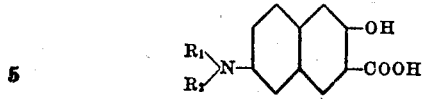

wherein $R_1$ means an alkyl- or aralkyl- or aryl radicle and $R_2$ stands for hydrogen or an alkyl radicle.

5. As new compounds 2.3-hydroxynaphthoic acid derivatives corresponding probably to the general formula:

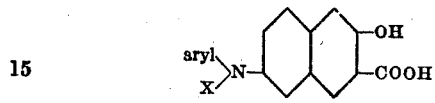

wherein X means hydrogen or an alkyl group.

6. As new compounds 2.3-hydroxynaphthoic acid derivatives corresponding probably to the general formula:

wherein X means hydrogen and $y$ an alkyl-, alkoxy-group or an halogen atom.

7. As new compounds 2.3-hydroxynaphthoic acid derivatives corresponding probably to the general fomula:

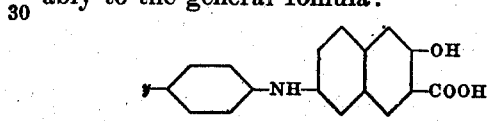

wherein $y$ means an alkyl-, alkoxy-group or an halogen atom.

8. As a new compound 6-parachlorphenylamino-2-hydroxy-naphthalene-3-carboxylic acid of the formula:

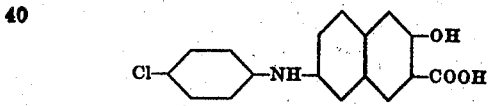

In testimony whereof, I affix my signature.
BRUNO HEYN.